United States Patent
Moy

Patent Number: 5,307,764
Date of Patent: May 3, 1994

[54] PROTECTIVE PET COLLAR

[76] Inventor: Kelly A. Moy, 125 Galewood Cir., San Francisco, Calif. 94131

[21] Appl. No.: 52,019

[22] Filed: Apr. 22, 1993

[51] Int. Cl.⁵ .............................................. A01K 27/00
[52] U.S. Cl. .................................. 119/815; 119/855; 119/856
[58] Field of Search .............. 119/106, 96, 143, 814, 119/815, 855, 856, 865, 816, 821

[56] References Cited

U.S. PATENT DOCUMENTS

| | | |
|---|---|---|
| 180,518 | 8/1876 | Armentrout ........................ 119/106 |
| 205,515 | 7/1878 | Von Culin . |
| 2,810,368 | 10/1957 | McCombe . |
| 2,989,030 | 6/1961 | Draheim . |
| 2,998,008 | 8/1961 | Klesa . |
| 3,013,530 | 12/1961 | Zeman . |
| 3,036,554 | 5/1962 | Johnson . |
| 3,072,098 | 1/1963 | Boomle . |
| 3,942,306 | 3/1976 | Kulka . |
| 4,328,605 | 5/1982 | Hutchison et al. . |
| 4,476,814 | 10/1984 | Miller ................................ 119/106 |
| 4,489,676 | 12/1984 | Colquist .............................. 119/96 |
| 4,598,666 | 7/1986 | Spanko ............................... 119/106 |
| 5,012,764 | 5/1991 | Fick et al. .......................... 119/106 |

FOREIGN PATENT DOCUMENTS 1191748  8/1985  Canada .......................... 119/106

*Primary Examiner*—Gene Mancene
*Assistant Examiner*—Todd E. Manahan
*Attorney, Agent, or Firm*—Skjerven, Morrill, MacPherson, Franklin & Friel

[57] ABSTRACT

A sheet of flexible material is fastened around the neck of a household pet or other animal to inhibit the animal from bending its neck and thereby biting or licking wounds or other sensitive areas on its body.

9 Claims, 1 Drawing Sheet

PROTECTIVE PET COLLAR

FIELD OF THE INVENTION

This invention relates to devices for preventing a wounded or convalescing animal from injuring itself and, in particular, to a protective collar or neck brace which prevents the animal from biting or licking the affected portions of its body.

BACKGROUND OF THE INVENTION

It is a well known fact that household pets are apt to lick or nibble at wounds, sores, rashes, sutures, flea bites and other afflicted portions of their bodies. This propensity can not only retard the healing process but also lead to complications which require further medical attention. Therefore, unless the animal is immobilized with some sort of body truss, it must be prevented from reaching the wound or irritated area with its mouth.

At present, one of the most common devices for doing this is the so-called Elizabethan collar, which is described in U.S. Pat. No. 3,036,554 to F. L. Johnson. A disk in the form of a truncated cone is fitted around the animal's neck and prevents the animal from reaching its body with its mouth. Elizabethan collars, however, are rather cumbersome devices, and they interfere with the ability of the animal to sleep, eat and drink. They also interfere with the animal's mobility, making it difficult to run, climb stairs, and maneuver around corners and through narrow spaces. They act as a barrier between the animal and its owner, preventing the owner from holding the animal and preventing the animal from jumping up on the owner. Finally, Elizabethan collars are unsightly and can be a source of embarrassment to the owner. Other similar collars are described in U.S. Pat. No. 3,013,530 and U.S. Pat. No. 3,072,098.

SUMMARY OF THE INVENTION

All of these problems are overcome with the protective collar of this invention. A strip of hard but flexible material is formed into a cylindrical or tubular shape around the animal's neck. The width of the strip (i.e., the axial length of the tubular shape) is correlated with the length of the animal's neck, so that an edge of the collar presses on the animal's neck when it attempts to turn its head. The animal experiences some discomfort from this, the discomfort increasing as its head swings further toward its body. Ultimately, the collar prevents the animal from bending its neck further, well before it is able to make contact between its mouth and its body. The stiffness of the collar (i.e., its resistance to deformation as the animal attempts to bend its neck) is largely attributable to the fact that it is formed into a tubular shape. The curvature of the collar when worn by the animal increases the rigidity of its edges and thereby produces the discomfort which deters the animal from attempting to bend its neck.

In a preferred embodiment, the collar is constructed of a sheet of plastic and is held on the animal's neck with a VELCRO fastener.

DESCRIPTION OF THE INVENTION

Figure 1:
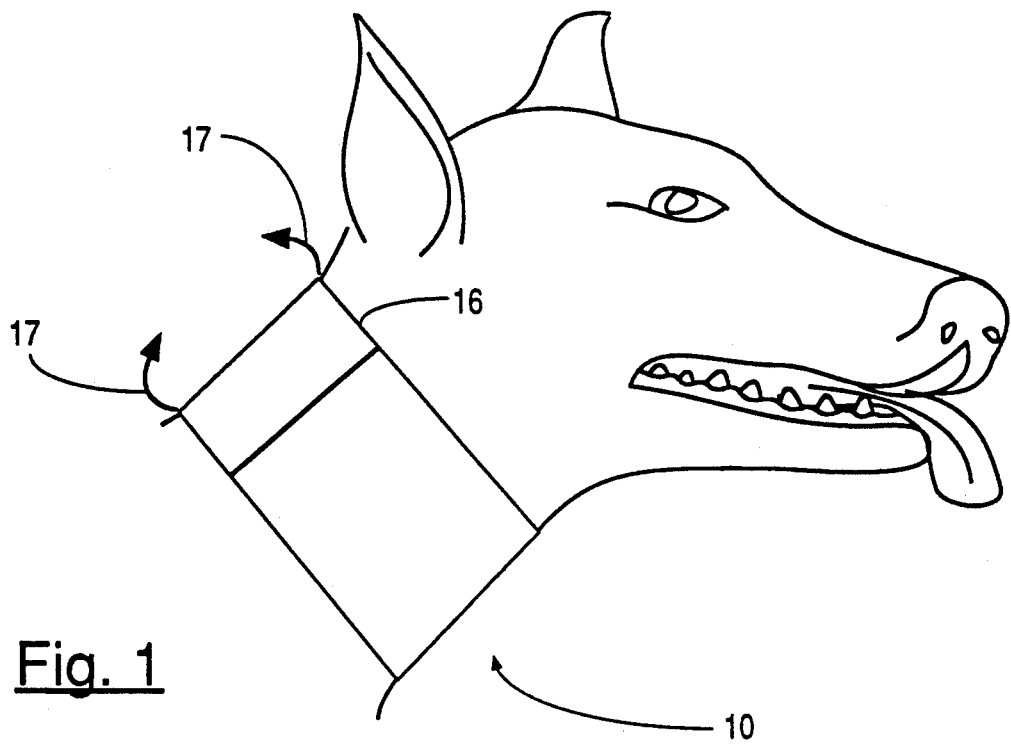
FIG. 1 illustrates the protective collar of this invention as worn by a dog.

FIG. 1 illustrates a protective collar 10 being worn by a dog. Collar 10 is bent into a tubular form snugly enclosing the dog's neck, and fastened.

Figure 2:
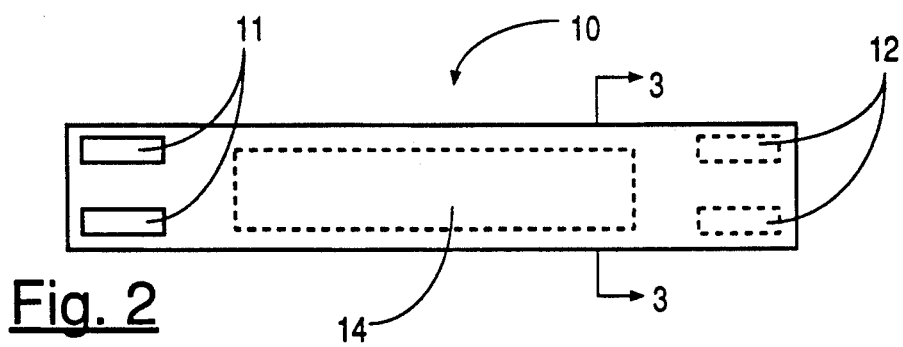
FIG. 2 illustrates a top plan view of the protective collar.

FIG. 2 illustrates a top plan view of protective collar 10 showing VELCRO fastener strips 11 at one end of the collar which mate with corresponding VELCRO strips 12 attached to the other side of the collar when collar 10 is wrapped around an animal's neck.

Figure 3:
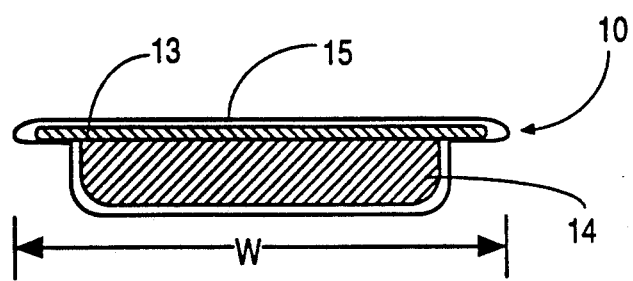
FIG. 3 illustrates a cross-sectional view of the protective collar taken at section 3—3 shown in FIG. 2.

FIG. 3 illustrates a cross-sectional view of collar 10 taken at section 3—3 shown in FIG. 2. A sheet 13 is made of a flexible material, which in the preferred embodiment is a sheet of low density polyethylene. Pressed against the underside of sheet 13 is a foam pad 14 which may make the collar somewhat more comfortable when it is being worn by the animal. Sheet 13 and foam pad 14 are enclosed by a fabric 15. It is to be understood that foam pad 14 and fabric 15 are optional and not at all essential to the invention.

The correct width W of collar 10 depends on the size of the animal's neck. For most dogs, W will be in the range of from 2 inches to 4 inches; for most cats, W will be in the range of from 1 inch to 1½ inches. Preferably, the collar should extend substantially between the animal's scapula (shoulder blade) at the lower edge and its mandible (lower jaw) and atlas vertebra at the upper edge. Essentially the animal's entire neck should be enclosed. The length of collar 10 and the placement of VELCRO pads 11 and 12 should be such that collar 10 fits snugly on the animal's neck but does not create discomfort unless the animal attempts to turn its head. Obviously, the animal's breathing and circulation should not be restricted when the collar is in place.

Referring again to FIG. 1, as the dog attempts to bend its neck, an edge 16 of collar 10 presses on its skin, creating a certain amount of discomfort or minor pain and deterring the dog from bending its neck further. If the dog continues to bend its neck further, eventually collar 10 will prevent the dog from any further bending movement. The thickness of sheet 13 should be correlated with the width of collar 10, so that transverse bending (indicated by arrows 17 in FIG. 1) is substantially prevented by the curvature of the collar. For example, a collar 3 inches wide using a sheet of low density polyethylene approximately ⅛ inch thick was found suitable for a cairn terrier.

With the collar of this invention, the animal is free to eat, drink and sleep without undue inconvenience or discomfort. Moreover, it can walk, run and otherwise engage in most of its normal activities, the only restriction being on its ability to turn its head so as to approach its body with its mouth.

The collar of this invention is suitable for use with dogs, cats and other household pets, as well as any animal whose head needs to be restrained in order to prevent it from injuring itself. The VELCRO fasteners included in the embodiment may be replaced by buckles, tie strings, spring clips or any other type of fastener. The foregoing embodiment is therefore to be considered as illustrative only, the full scope of this invention being defined only in the following claims.

I claim:

1. A protective collar for a household pet or other animal, said collar comprising:

a sheet of hard, flexible material; and means for fastening said sheet so as to form a tubular shape around the neck of said animal;

said collar having a width such that, when said tubular shape is formed around the neck of said animal, said collar substantially prevents said animal from bending its neck so as to bite or lick an affected area on its body.

2. The collar of claim 1 wherein the width of the collar is determined such that, when said tubular shape is formed around the neck of said animal, the collar extends between the animal's scapula and its mandible.

3. The collar of claim 1 wherein the thickness of said sheet is determined such that the collar is resistant to deformation when the animal attempts to bend its neck.

4. The collar of claim 1 wherein the means for fastening comprises at least one pair of VELCRO fastener strips.

5. The collar of claim 1 wherein the width of said tubular shape, measured in a direction parallel to an axis thereof, is substantially uniform.

6. The collar of claim 5, wherein said collar is intended for a dog, and the width of said collar is in the range of from 2 inches to 4 inches.

7. The collar of claim 5 wherein said collar is not intended for a cat, and the width of said collar is in the range of from 1 inches to 1½ inches.

8. A protective collar for a household pet or other animal, said collar comprising:

a sheet of hard, flexible material, said sheet having a length and a width; and fasteners positioned near opposite edges of said sheet;

said length and said width of said sheet being selected such that, when said fasteners are connected, said collar is capable of enclosing said animal's neck so as to inhibit said animal from bending its neck.

9. A method of preventing a household pet or other animal from bending its neck so as to lick or bite an affected part of its body, said method comprising:

providing a sheet of hard, flexible material having a width approximately equal to the length of said animal's neck;

bending said sheet into a tubular shape so as to enclose said animal's neck; and fastening said sheet around said animal's neck, said sheet extending substantially between said animal's scapula and its mandible.

* * * * *